United States Patent
Miller et al.

(10) Patent No.: US 11,036,484 B2
(45) Date of Patent: Jun. 15, 2021

(54) SOFTWARE UPDATE MANAGEMENT

(71) Applicant: FORD GLOBAL TECHNOLOGIES, LLC, Dearborn, MI (US)

(72) Inventors: Jason Michael Miller, Woodhaven, MI (US); Sangeetha Sangameswaran, Canton, MI (US); Daniel Joseph Madrid, Livonia, MI (US); Parvathy Viswamohan, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 15/399,913

(22) Filed: Jan. 6, 2017

(65) Prior Publication Data
US 2018/0196656 A1    Jul. 12, 2018

(51) Int. Cl.
*G06F 8/65* (2018.01)
*H04L 29/08* (2006.01)
*G06F 8/71* (2018.01)
*G06F 8/654* (2018.01)

(52) U.S. Cl.
CPC .............. *G06F 8/65* (2013.01); *G06F 8/654* (2018.02); *G06F 8/71* (2013.01); *H04L 67/12* (2013.01); *H04L 67/34* (2013.01)

(58) Field of Classification Search
CPC ....................................................... G06F 8/65
USPC .............................................................. 717/172
See application file for complete search history.

(56) References Cited

U.S. PATENT DOCUMENTS

| 8,245,214 | B2 | 8/2012 | Long et al. | |
| 9,128,798 | B2 | 9/2015 | Hoffman et al. | |
| 9,575,743 | B1 * | 2/2017 | Chun | G06F 8/65 |
| 2009/0119657 | A1 * | 5/2009 | Link, II | G06F 8/65 717/171 |
| 2014/0282470 | A1 * | 9/2014 | Buga | G06F 8/65 717/170 |
| 2015/0113520 | A1 * | 4/2015 | Kotani | G06F 8/65 717/172 |
| 2015/0309784 | A1 * | 10/2015 | Molin | G06F 8/65 701/71 |
| 2016/0103980 | A1 | 4/2016 | Ricci et al. | |
| 2017/0123782 | A1 * | 5/2017 | Choi | G06F 8/65 |

* cited by examiner

*Primary Examiner* — Qing Chen
*Assistant Examiner* — Clint Thatcher
(74) *Attorney, Agent, or Firm* — Brooks Kushman PC; Michael Spenner

(57) ABSTRACT

A system for a vehicle includes a controller, and a telematics control unit configured to, in response to receiving instructions indicating transfer and installation techniques supported by the controller to update the controller with a software update, transfer the software update to the controller responsive to vehicle state being compatible with the transfer technique, and install the software update to the controller responsive to vehicle state being compatible with the installation technique.

19 Claims, 3 Drawing Sheets

SOFTWARE UPDATE MANAGEMENT

TECHNICAL FIELD

The present disclosure relates to systems and methods for providing over-the-air (OTA) software updates to a plurality of controllers supporting the same or different update techniques.

BACKGROUND

One or more software and/or hardware components of a vehicle may require periodic or occasional electronic updates. In one example, the updates may include changes to the software or settings of the vehicle to address an issue or to provide improved functionality to current software or settings. In another example, the updates may include updated configuration settings for one or more vehicle controllers and/or updated versions of software or firmware to be installed on the one or more vehicle controllers.

The vehicle may be configured to receive electronic updates via a wired or a wireless connection. In one example, a technician at a car dealership or a service shop may download the updates onto the vehicle using a wired land access network (LAN) connection. In another example, the vehicle may be configured to receive over-the-air (OTA) software updates, such as software updates received via a wireless connection to a server.

SUMMARY

A system for a vehicle includes a controller, and a telematics control unit configured to, in response to receiving instructions indicating transfer and installation techniques supported by the controller to update the controller with a software update, transfer the software update to the controller responsive to vehicle state being compatible with the transfer technique, and install the software update to the controller responsive to vehicle state being compatible with the installation technique.

A method for a vehicle includes, in response to receiving, by a telematics control unit, instructions indicating transfer and installation techniques supported by a controller to update the controller with a software update, transferring the software update to the controller responsive to vehicle state being compatible with the transfer technique, and installing the software update to the controller responsive to vehicle state being compatible with the installation technique.

A method includes receiving instructions to update first and second controllers, the instructions indicating different transfer and installation techniques supported by the respective controllers, transferring a first software update to the first controller responsive to vehicle state being compatible with a first transfer technique, transferring a second software update to the second controller responsive to vehicle state being compatible with a second transfer technique, and installing the first software update to the first controller and the second software update to the second controller responsive to vehicle state being compatible with the installation techniques for both the first and second controllers.

DETAILED DESCRIPTION

Figure 1:
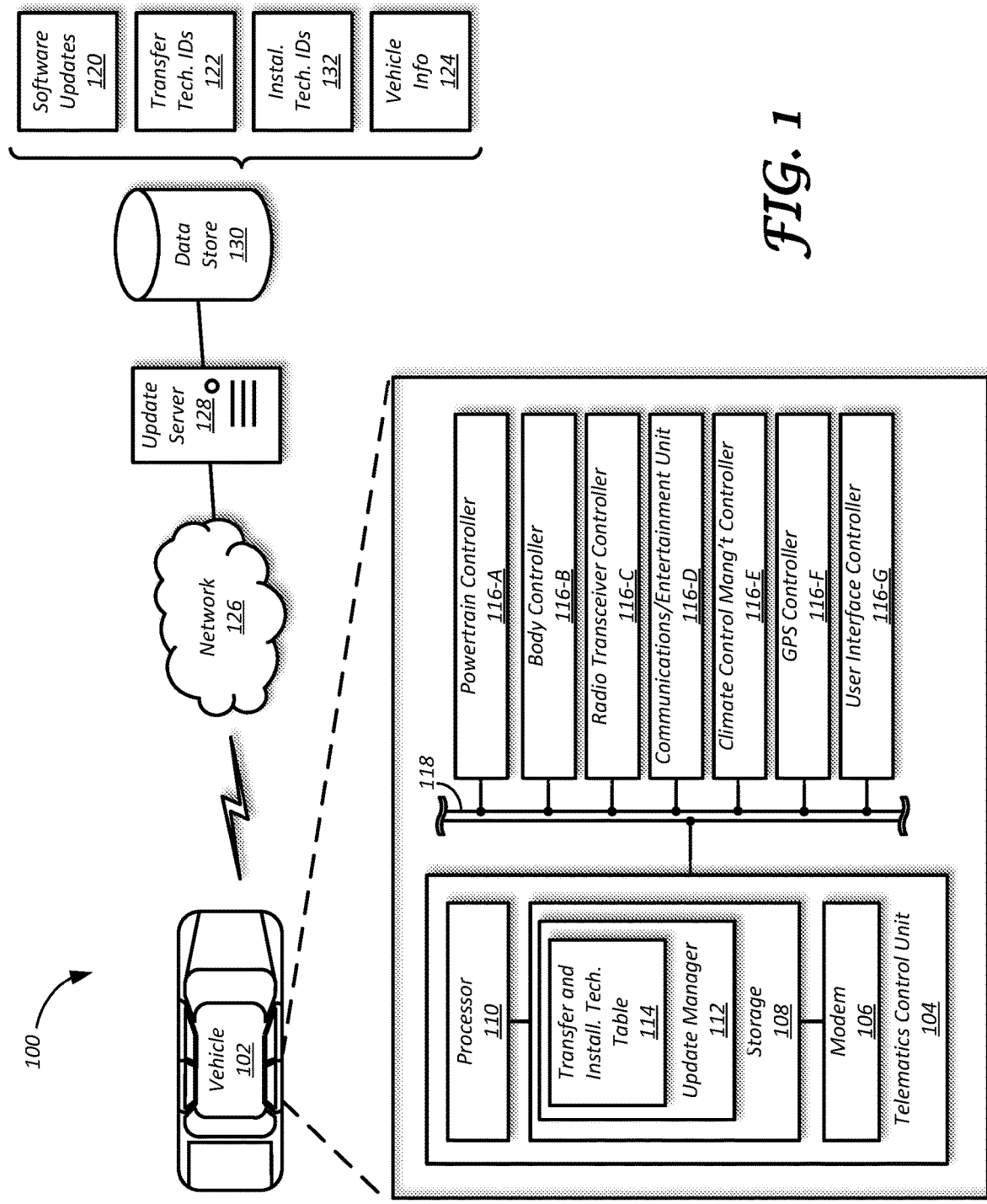
FIG. 1 is a block diagram of illustrating a system for transferring and installing software updates on vehicle controllers.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A plurality of controllers performing a variety of functions on a vehicle may be configured to receive periodic or occasional software and firmware (referred to herein generally as software) updates. As some non-limiting examples, the software updates may help address efficiency issues, functionality changes, and security vulnerabilities in the vehicles out in the field or in customer's hands. However, the hardware of the vehicle controllers may dictate which software update techniques are supported by the controllers. Moreover, implementing the software updates across several controllers at the same time may include reconciling the timing and order of the updates.

A plurality of software updates for vehicle controllers may be downloaded from an update server. For instance, a telematics control unit (TCU) of a vehicle may be configured to receive an instruction file indicting a set of update files to be applied to the controller, and may download these software updates for the controllers from the update server. These software updates may then be applied to vehicle controllers according to transfer and installation techniques supported by the respective vehicle controllers. The transfer and installation techniques may include, as some examples, a swap (A|B) technique, an erase-and-replace (E|R) technique, or an external flash E|R technique. The transfer and installation techniques supported by the controllers may be specified in the instruction file received from the update server. The TCU may accordingly transfer the downloaded software updates to the corresponding controller using the transfer technique indicated in the instruction file. The TCU may further install the software updates to the corresponding controller using the installation technique indicated in the instruction file.

Additionally or alternatively, the TCU may be configured to select an appropriate ignition cycle, or another vehicle state, to initiate transfer and installation of the software updates in each of the controllers. Thus, the TCU may transfer and install the software updates in response to vehicle state being compatible with the corresponding transfer and installation techniques. This process accordingly allows efficient transfer and installation of software updates across vehicle controllers that support different transfer and installation techniques.

FIG. 1 illustrates an example system 100 for providing software updates 120 to a vehicle 102. The vehicle 102 may include a TCU 104 having a modem 106 in communication over a network 126 with an update server 128 (e.g., directly, or via a mobile device of a vehicle occupant). The update server 128 may communicate with a data store 130 configured to maintain software updates 120 for download. The system 100 may further include a software update manager 112 installed to the vehicle 102 and configured to transfer and install software updates 120 to the TCU 104 itself or to other controllers 116 of the vehicle 102. While an example system 100 is shown in FIG. 1, the example components illustrated in the Figure are not intended to be limiting. Indeed, the system 100 may have more or fewer components, and additional or alternative components and/or implementations may be used. As one non-limiting example, the update manager 112 and its corresponding functionality may reside in one or more controllers 116 of the vehicle 102 other than the TCU 104.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the operating characteristics of the vehicle 102 may correspondingly vary. As some other possibilities, vehicle 102 may have different characteristics with respect to passenger capacity, towing ability and capacity, and storage volume.

When the vehicle 102 is assembled, the vehicle 102 may include various hardware and software components, such as, but not limed to, the one or more vehicle controllers 116 (represented as discrete controllers 116-A through 116-G). The controllers 116 may be configured to monitor and manage various vehicle 102 functions under the power of the vehicle battery and/or drivetrain. As will be described in further detail in reference to FIG. 2, the controllers 116 may include one or more processors (e.g., microprocessors) configured to execute firmware or software programs stored on one or more storage devices of the controller 116. While the controllers 116 are illustrated as separate components, the vehicle controllers 116 may share physical hardware, firmware, and/or software, such that the functionality from multiple controllers 116 may be integrated into a single controller 116, and that the functionality of various such controllers 116 may be distributed across a plurality of controllers 116.

The vehicle controllers 116 may, for example, include, but are not limited to, a powertrain controller 116-A configured to manage engine operating components, a body controller 116-B configured to manage various power control functions such as exterior lighting, interior lighting, keyless entry, remote start, and point of access status verification, a radio transceiver controller 116-C configured to communicate with key fobs, mobile devices, or other local vehicle 102 devices, an entertainment controller 116-D configured to support voice command and BLUETOOTH interfaces with the driver and driver carry-on devices, a climate control management controller 116-E configured to monitor and manage heating and cooling system components (e.g., compressor clutch, blower fan, temperature sensors, etc.), a global positioning system (GPS) controller 116-F configured to provide vehicle location information, and a human-machine interface (HMI) controller 116-G configured to receive user input via various buttons or other controls, as well as provide vehicle status information to a driver.

The vehicle bus 118 may include various methods of communication available between the vehicle controllers 116, as well as between the TCU 104 and the vehicle controllers 116. The vehicle bus 118 may further include one or more of a vehicle controller area network (CAN), an Ethernet network, and a media oriented system transfer (MOST) network.

The TCU 104 may include one or more processors 110 (e.g., microprocessors) configured to execute firmware or software programs stored on one or more storage devices 108 of the TCU 104. The TCU 104 may further include network hardware configured to facilitate communication between the vehicle controllers 116 and to facilitate communication between the vehicle 102 and other devices of the system 100 via the network 126. The network 126 may include one or more interconnected communication networks such as the Internet, a cable television distribution network, a satellite link network, a local area network, a wide area network, and a telephone network, as some non-limiting examples. As another example, the TCU 104 may be configured to communicate via one or more of Bluetooth, Wi-Fi, and wired USB network connections and facilitate data transmission between the network 126 and a mobile device (not shown).

The data store 130 may be configured to store the software updates 120. The software updates 120 may include changes to the software or settings of the vehicle 102 to address an issue with the current software or settings, or to provide improved functionality to the current software. The software updates 120 may include, for example, updated configuration settings for one or more vehicle controllers 116, and/or updated versions of software or firmware to be installed on one or more vehicle controllers 116. In some cases the software updates 120 may include a single data segment, while in other cases the software updates 120 may be organized into multiple segments, elements, or chunks, all of which may need to be downloaded in order to complete the overall software update 120 to be installed.

The data store 130 may be further configured to store additional information regarding the software updates 120. For example, the data store 130 may be configured to identify which vehicle controllers 116 are associated with which software updates 120. The data store 130 may further store information indicative of the compatibility of the software updates 120 with specifications of the vehicle 102. For instance, a storage entry for the software update 120 may indicate that the software update 120 is compatible with a particular make and model of the vehicle 102, or that it is associated with a particular version(s) of the vehicle controller 116.

The data store 130 may also be configured to store transfer technique identifiers 122 and installation technique identifiers 132 indicating, respectively, transfer and installation techniques supported by each of the controllers 116. The transfer and installation techniques may be based on firmware and/or software configuration of a given vehicle controller 116 and may, for example, include a swap (A|B) technique, an E|R technique, an external flash E|R technique, and so on. The transfer techniques may, for instance, include processor instructions for performing one or more operations, controls, and functions to complete transfer of the software update file 120 to the vehicle controller 116. As another example, the installation techniques may include processor instructions for performing one or more operations, controls, and functions to initiate an installation event such that the software update 120 is implemented on the vehicle controller 116 being updated. By virtue of different configurations of the vehicle controllers 116 in the vehicle 102, the transfer and installation techniques associated with the vehicle controllers 116 may also differ. As one example, the transfer and installation techniques may each be compatible with vehicle states that are different from one another. The system may therefore reconcile (or synchronize) transfer and/or installation of the software updates 120 across multiple vehicle controllers 116 in response to current vehicle state being compatible with the supported transfer and installation techniques.

As an example, the processor instructions for the vehicle controller 116 that supports a swap (A|B) technique may include instructions for transferring the software updates 120 to the vehicle controller 116 in response to vehicle 102 state being one of ignition ON or ignition OFF. The instructions for the swap technique may further include installing the software updates 120 to the controller 116 in response to current state of the vehicle 102 being one of ignition ON or ignition OFF. Stated another way, the vehicle states compatible with the transfer and installation techniques of the swap-updated controller 116 may be the same, such that installation of the software updates 120 may be performed following their transfer to the controller 116 and without a change in a vehicle state.

As another example, for the vehicle controller 116 configured to be updated using an external flash E|R technique the processor instructions may include transferring the software updates 120 to the vehicle controller 116 in response to vehicle state being one of ignition ON or ignition OFF and installing the updates 120 to the controller 116 in response to vehicle state being ignition OFF. Therefore, unlike with the vehicle controller 116 supporting updates using a swap, the configuration of the vehicle controller 116 using an external flash E|R technique may not permit installing the updates when the vehicle 102 is being driven. Instead, the installation of the updates on the vehicle controller 116 supporting updates using an external flash E|R may take place responsive to a change in current vehicle state, e.g., change in vehicle 102 state to ignition OFF.

As still another example, configuration of the vehicle controller 116 using an E|R technique may not permit either a transfer of the software updates 120 to the vehicle controller 116 or an installation by the vehicle controller 116 at a time when the vehicle is being driven. Stated another way, transfer and installation of the software updates 120 on the vehicle controller 116 that supporting using erase-and-replace may be performed in response to current vehicle 102 state being ignition OFF.

It follows then that the software updates 120 for a swap-updated controller 116 and an external flash E|R-updated controller 116 may be transferred at the same time when the vehicle 102 is being driven and may be installed at different times, e.g., installed to the swap-updated controller 116 while the vehicle 102 is still being driven and installed to the external flash E|R-updated controller 116 in response to vehicle 102 state being ignition OFF. While the examples of vehicle states are indicated as those of states of ignition of the vehicle 102, states of other parameters indicative of vehicle state, such as, but not limited to, vehicle speed, transmission gear, brake pedal position, steering angle, and so on, are also contemplated.

Vehicle information 124 may include information configured to identify the vehicle 102 or the configuration of the vehicle 102. For example, the vehicle information 124 may include a vehicle identification number (VIN) published to the vehicle bus 118, or subscriber identity module (SIM) information of the modem 106 such as international mobile station equipment identity (IMEI). Additionally or alternately, the vehicle information 124 may include version information for at least a portion of the hardware and software components of the vehicle controllers 116 of the vehicle 102.

The update server 128 may include one or more devices configured to transmit to the vehicle 102 the software updates 120 stored by the data store 130. For example, the update server 128 may be configured to receive requests for available software updates 120 from the vehicle 102. The requests may include the vehicle information 124 allowing the update server 128 to query the data store 130 for the software updates 120 associated with the vehicle 102 as it is currently configured. The update server 128 may provide, responsive to the requests, indications of the available software updates 120 (or the software updates 120 themselves) to update the requesting vehicle 102.

The update server 128 may be further configured to transmit to the update manager 112 of the vehicle 102 one or more transfer technique identifiers 122 and installation techniques identifiers 132 associated with the vehicle controllers 116 being updated. For example, in response to identifying that the software updates 120 are available for the vehicle 102, the update server 128 may query the data store 130 for the transfer and installation technique identifiers 122, 132 associated with the vehicle controllers 116 for which available software updates 120 have been identified.

The update manager 112 may be configured to manage the transfer and installation of the software updates 120 to the vehicle 102. The update manager 112 may be configured to utilize the TCU 104 access to the vehicle bus 118 to communicate with the vehicle controllers 116. Upon or after assembly of the vehicle 102, the update manager 112 may be configured to query for existence and version information for at least a portion of the hardware and software components defining the vehicle controllers 116. In one example, the update manager 112 may trigger a periodic check for new software updates 120. In another example, the update manager 112 may receive a command from a user indicative of a request to check for the software updates 120.

When triggered, the update manager 112 may be configured to send an update request to the update server 128 to inquire whether software updates 120 for the vehicle 102 are available. For example, the update manager 112 may query the update server 128 using the vehicle information 124 (or, if the data store 130 maintains current vehicle information 124, an identifier of the vehicle 102), and may receive a response from the update server 128 indicative of whether new software updates 120 for the vehicle 102 are available (e.g., an instruction file including links or other identifiers of the software updates 120 for the vehicle 102 to download). If the response to the update manager 112 indicates the software updates 120 are available for the vehicle 102, the update manager 112 may be further configured to download, transfer, and install the indicated updates, or in other cases queue the downloaded software updates 120 to be transferred and installed.

The update manager 112 may be configured to facilitate the downloading of the software updates 120 to the vehicle 102. For instance, the update manager 112 may be configured to receive a listing of the software updates 120 identified by the update server 128 as being available for download and install. The update manager 112 may be further configured to detect when the vehicle 102 is connected to the network 126, e.g., via the modem 106, and perform the downloading of the software updates 120 when connected.

The update manager 112 may be further configured to transfer and install the downloaded software updates 120 on the vehicle controllers 116 according to transfer and installation techniques supported by the respective vehicle controllers 116. For instance, the instruction file received by the update manager 112 from the update server 128 may specify, e.g., using identifiers 122, 132 and so on, the transfer and installation techniques supported by the vehicle controllers 116 that are being updated. These transfer and installation techniques may include, as some examples, a swap (A|B) technique, an E|R technique, or an external flash E|R technique, and each of the vehicle controllers 116 may support the same or different transfer and installation techniques.

The update manager 112 may be configured to optimize timing and order of transfer and installation of the software updates 120 for the respective vehicle controllers 116 in response to vehicle 102 state being compatible with the supported transfer and installation techniques. The update manager 112 may, for example, reference a transfer and installation techniques table 114 to identify one or more vehicle 102 states compatible with the supported transfer and installation techniques. The update manager 112 may then transfer the downloaded software updates 120 to the corresponding vehicle controller 116 when the vehicle 102 is in a predefined operating state compatible with the transfer technique of the vehicle controller 116. The update manager 112 may further initiate an installation of the transferred software updates 120 on the corresponding vehicle controller 116 responsive to the vehicle 102 being in a predefined operating state compatible with the installation technique of the vehicle controller 116.

For example, the update manager 112 may select an appropriate vehicle state to transfer the software updates 120 to each of the corresponding vehicle controllers 116, such that an update event, e.g., installation of the updates 120 may take place. Thus, at an appropriate vehicle state, e.g., an ignition state compatible with their supported transfer techniques, the vehicle controllers 116 may transfer the software updates 120 to an internal or external memory location associated with each of the vehicle controllers 116 being updated. The update manager 112 may, accordingly, optimize the transfer of the downloaded software updates 120 across the vehicle controllers 116 that implement different transfer techniques.

In another example, the update manager 112 may install the transferred software updates 120 to each of the corresponding vehicle controllers 116 during the same or a different vehicle state. Said another way, at an appropriate vehicle state, e.g., an ignition state compatible with their supported installation techniques, the update manager 112 may install the software updates 120 to an active memory location associated with each of the vehicle controllers 116 being updated. The update manager 112 accordingly allows optimizing of installation of the transferred software updates 120 across the vehicle controllers 116 that implement different installation techniques.

Figure 2:
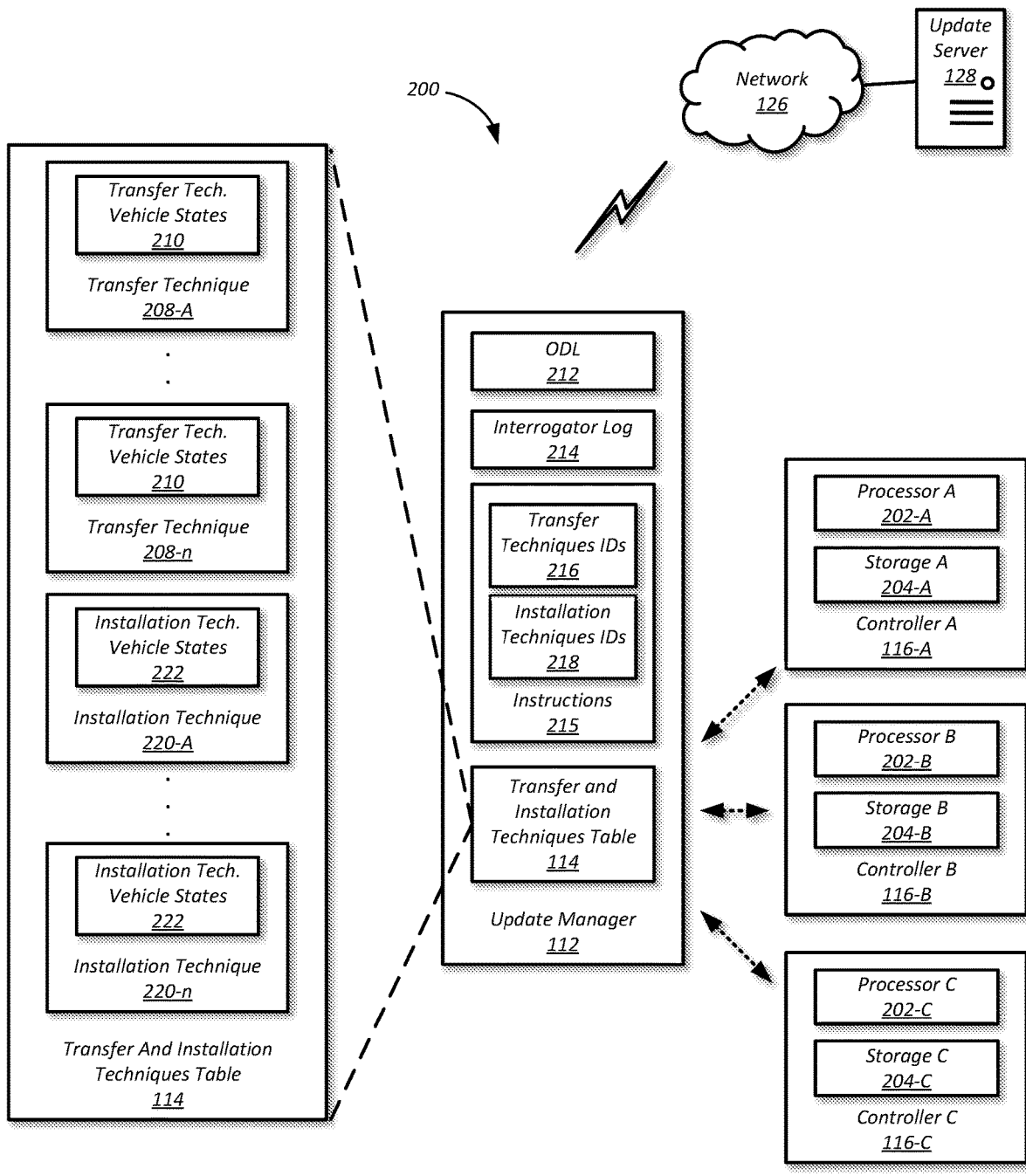
FIG. 2 is a block diagram illustrating a system for identifying transfer and installation techniques based on a hardware or software configuration of the controllers.

FIG. 2 illustrates a software update system 200 for the vehicle 102. The update manager 112 may reference an optimized data identifier list (ODL) file 212 that defines the specific information which to query from the controller 116 and where such information may be located. The ODL file 212 may, in some cases, be installed as part of an installation of software on the TCU 104. The update manager 112 may use the queried data to generate an interrogator log 214. The interrogator log 214 may be a file or other data structure including information collected from the vehicle 102 for use in identifying the current software version state of the vehicle 102. The interrogator log 214 may include information identifying the specific vehicle 102 as well as one or more of the vehicle controllers 116 using parameters and values such as, but not limited to, controller name, controller serial number, VIN, hardware part number, MAC address, part numbers of software applications, languages, and service packs installed on the controller, available storage space on the controller, and status information regarding the installation of previous updates.

The update manager 112 may connect with the update server 128 using the network 126. In one example, the update manager 112 may send the update server 128 the interrogator log 214 that includes information identifying the specific vehicle 102 and information related to a current software version of the controllers 116 of the vehicle 102. The update server 128 may receive these communications from the vehicles 102, and may maintain a data store of the hardware configurations and software (e.g., firmware, etc.) versions linked to identifiers of the vehicles 102, e.g., linked to VIN of the vehicle 102. The update server 128 may further maintain a data store of the current software version associated with the controllers 116 of the vehicle 102 and the transfer and installation technique identifiers 122, 132 of the transfer and installation techniques supported by the controllers 116.

The update server 128 may send an instruction file (hereinafter, instructions) 215 to the update manager 112 for updating each of the vehicle controllers 116. The instructions 215 may be indicative of a set of update files to be applied to the controller 116 and where such files may be downloaded. The instructions 215 may further include the transfer and installation technique identifiers 216, 218 indicative of one or more transfer and installation techniques 208, 220, respectively, supported by the vehicle controller 116 being updated. In one example, the update manager 112 may query a transfer and installation techniques table 206 to identify the transfer and installation techniques 208, 220 corresponding to the respective transfer and installation technique identifiers 216, 218 included in the instructions 215 from the update server 128.

The transfer and installation techniques 208, 220 supported by a given vehicle controller 116 may be based on firmware and/or software configuration of that vehicle controller 116. In one example, the firmware and/or software components defining each of the vehicle controllers 116 may be same or different from one another. Each of the controllers 116 may, for instance, include one or more processors 202 (e.g., microprocessors) configured to execute firmware or software programs stored on one or more storage devices 204 of the vehicle controller 116. Based on a specific software and/or firmware configuration of a given controller 116, the installation technique supported by the controller 116 may be, for example, a swap (A|B) technique, an E|R technique, and an external flash E|R technique.

As an illustrative example, the transfer and installation technique 208, 220 for the vehicle controller 116 with active (primary) and inactive (secondary) storage portions may include operations or controls for transferring the software updates 120 to the vehicle controller 116 for installation to the secondary storage and transfer ("swapping") of the installed software updates 120 from the secondary to the primary storage.

Each of the transfer and installation techniques 208, 220 may include one or more corresponding transfer and installation vehicle states 210, 222. The transfer and installation vehicle states 210, 222 may be defined by configuration of the corresponding vehicle controller 116 and may include one or more operating states and/or parameter values of a vehicle system parameter, such as, but not limited to, one or more parameters associated with vehicle drivetrain, transmission, steering, suspension, braking, exhaust, climate control, infotainment systems, and so on, and/or sub-systems, or components of those vehicle systems. In one example, the transfer and installation vehicle states 210, 222 may be one or more of a predefined vehicle speed threshold, a predefined ignition state, e.g., ignition ON or ignition OFF, a predefined transmission gear state, e.g., PARK, NEUTRAL, DRIVE, and so on. To implement the downloaded software updates 120 on the vehicle controller 116 including non-volatile or persistent memory, the update manager 112 may accordingly be configured to transfer the software updates 120 and overwrite a prior software version using the transferred software updates 120 during an ignition OFF operating state of the vehicle 102.

While the transfer and installation vehicle states 210, 222 of the transfer and installation techniques 208, 220, respectively, are described as relating to a configuration of the storage 204 of the vehicle controller 116, configurations of other hardware and software components of the vehicle controller 116 are also possible and may each define same or different transfer and installation techniques 208, 222 from those described in reference to configuration of the storage 204.

Responsive to current vehicle state of the vehicle 102 being compatible with the transfer and installation vehicle states 210, 222 defining the transfer and installation techniques 208, 220, the update manager 112 transfers and installs the downloaded software updates 120 on the corresponding vehicle controller 116. For instance, the vehicle controller 116-A that includes active and inactive memory 204 portions may support the transfer technique 208-A having the associated transfer vehicle states 210. The update manager 112 may accordingly transfer the downloaded software updates 120 to the vehicle controller 116-A in response to operating states of the vehicle 102 being compatible with the transfer vehicle state 210 associated with the transfer technique 208-A.

The vehicle controller 116-A may further support the installation technique 220-A defining one or more operations to swap (or switch) the transferred software updates 120 from inactive memory to the active memory 204 portion. The installation technique 220-A includes corresponding installation vehicle states 222, such as, for example, ignition ON or OFF, vehicle speed being zero or nonzero, and so on. The update manager 112 may accordingly install the transferred software updates 120 to the vehicle controller 116-A responsive to operating states of the vehicle 102 being compatible with the installation vehicle states 222 associated with the installation technique 220-A.

In another example, the vehicle controller 116-B may support the transfer technique 208-B and the installation technique 220-B, together defining an erase-and-replace (E|R) update. The update manager 112 may, for instance, transfer the downloaded software updates 120 to the vehicle controller 116-B in response to state of the vehicle 102 being compatible with the transfer vehicle states 210 of the transfer technique 208-B, e.g., vehicle speed zero, ignition OFF, and so on. The update manager 112 may further install the transferred software updates 120 in the vehicle controller 116-B in response to state of the vehicle 102 being compatible with the installation vehicle states 222 of the installation technique 220-B, e.g., vehicle speed zero, ignition OFF, and so on.

In still another example, the vehicle controller 116-C may support the transfer technique 208-C and the installation technique 222-C, together defining an external flash erase-and-replace (E|R) update. As an example, the update manager 112 may transfer the downloaded software updates 120 to the vehicle controller 116-C responsive to state of the vehicle 102 being compatible with the transfer vehicle states 210 of the transfer technique 208-C, e.g. ignition ON, temporary memory portion active, and so on. The update manager 112 may be further configured to install the transferred software updates 120 to the vehicle controller 116-C responsive to state of the vehicle 102 being compatible with the installation vehicle states 222 of the installation technique 220-C, e.g. ignition ON, temporary memory portion active, and so on.

Additionally or alternatively, the update manager 112 may accumulate the vehicles states 210, 222 compatible with each of the transfer and installation techniques 208, 222 of the corresponding vehicle controllers 116, such that all transfers and installations compatible with a current vehicle state may be completed at the same time. Furthermore, responsive to detecting a vehicle state change, the update manager 112 may complete transfers and installations compatible with a new vehicle state and so on. The update manager 112 may be configured to detect a change in vehicle state responsive to receiving a corresponding signal from one or more sensors or other vehicle controllers 116.

Figure 3:
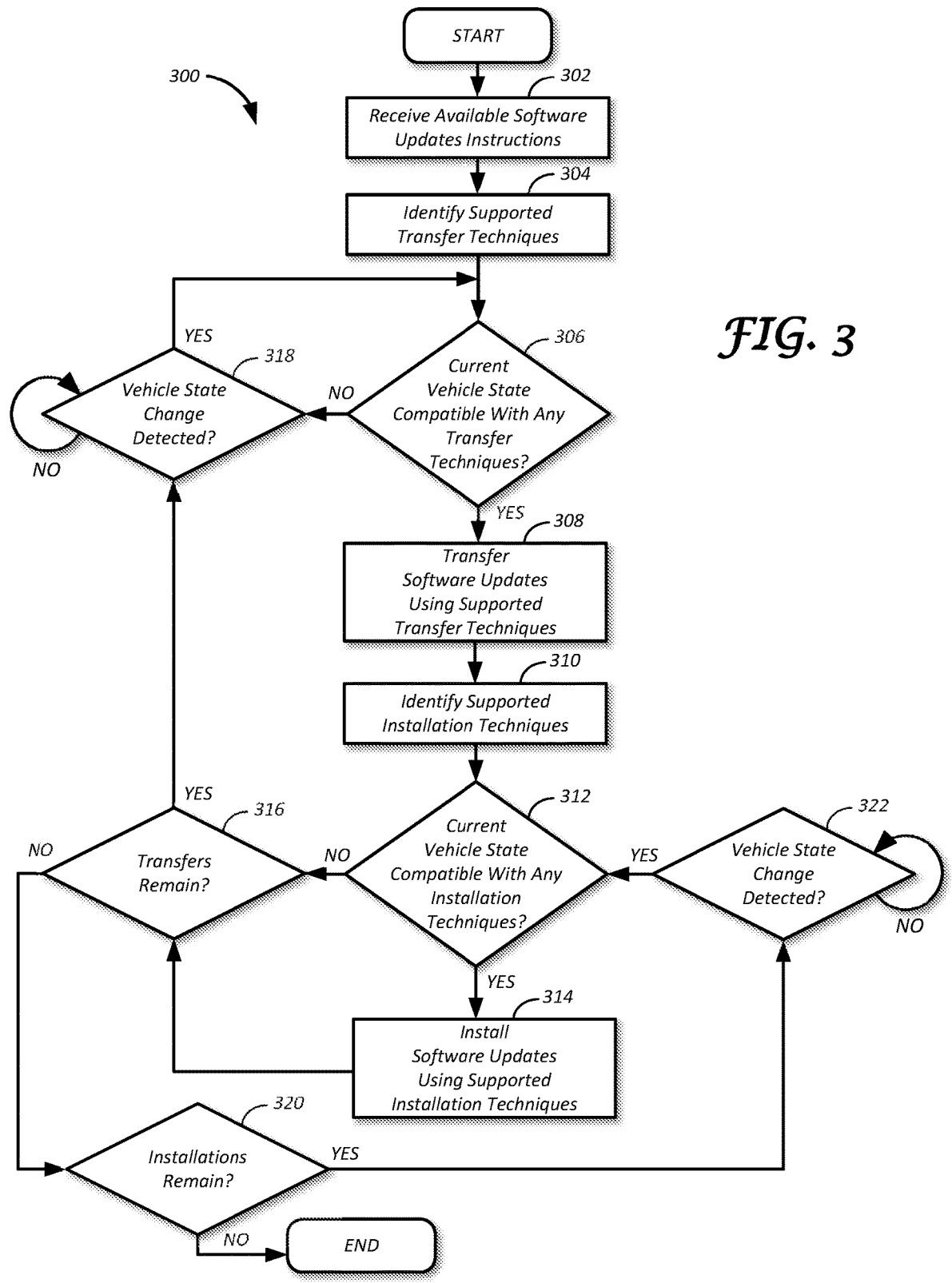
FIG. 3 is a flowchart illustrating an algorithm for transferring and installing software updates according to transfer and installation techniques supported by the controllers.

FIG. 3 illustrates an example process 300 for transferring and installing software updates using transfer and installation techniques support by respective vehicle controllers in response to detecting that vehicle state is compatible with one of the transfer or installation technique. The process 300 may be performed, for example, by the update manager 112 of the TCU 104 in communication with the update server 128 over the network 126.

At operation 302, the update manager 112 receives instructions 215 indicative of the software updates 120 available for the vehicle 102. The instructions 215 may further include one or more transfer and installation techniques identifiers 216, 218 indicative of the transfer and installation techniques 208, 220 supported by the controllers 116 being updated. The update manager 112 may download the available software updates 120 from the one or more update server 128 locations as indicated in the instructions 215.

At operation 304, the update manager 112 identifies the transfer techniques 208 supported by the controllers 116 being updated. The update manager 112 may, for example, reference the table 114 to identify the transfer techniques 208 associated with the transfer technique identifiers 216 as provided in the instructions 215. The update manager 112 may further determine the one or more transfer vehicle states 210 compatible with each of the transfer techniques 208.

The update manager 112 determines, at operation 306, whether current vehicle 102 state is compatible with at least one of the transfer techniques 208 supported by the controllers 116 being updated. In one example, the update manager 112 determines whether current vehicle 102 state matches the transfer vehicle states 210 compatible with the transfer techniques 208.

At operation 318, in response to determining that current state of the vehicle 102 is not compatible with any transfer techniques 208 supported by the controllers 116, e.g., determining that the current vehicle 102 state does not match any of the transfer vehicle states 210, the update manager 112 detects a change in the vehicle 102 state. The update manager 112 may determine that the vehicle 102 state has changed when the vehicle 102 goes from ignition ON to ignition OFF, and so on.

In response to determining that the current vehicle 102 state is compatible with the transfer technique 208 supported by the controller 116, the update manager 112, at operation 308, transfers the downloaded software updates 120 to the corresponding controllers 116 according to the supported transfer techniques 208. The process 300 may then proceed to the operation 310.

At operation 310, the update manager 112 identifies installation techniques 220 supported by the controllers 116 being updated. The update manager 112 may, as described in reference to FIG. 2, reference the table 114 to identify the installation techniques 220 associated with the installation technique identifiers 218 as provided in the instructions 215. The update manager 112 may further determine the one or more installation vehicle states 222 compatible with each of the installation techniques 220.

The update manager 112, at operation 312, determines whether current vehicle 102 state is compatible with at least one installation techniques 220 supported by the controllers 116. In one example, the update manager 112 determines whether current vehicle 102 state matches the installation vehicle states 222 compatible with the installation techniques 220. The process 300 may proceed to operation 316 in response to determining, at operation 312, that the current state of the vehicle 102 is not compatible with the installation techniques 220 supported by the vehicle controllers 116 being updated.

At operation 314, responsive to detecting that current vehicle 102 state is compatible with at least one installation technique 220, the update manager 112 installs the transferred software updates 120 on the corresponding controllers 116 according to the installation techniques 220 supported by each of the controllers 116.

The update manager 112 determines, at operation 316, whether any downloaded software updates 120 still need to be transferred to the vehicle controllers 116 being updated. In one instance, the downloaded software updates 120 for the vehicle controllers 116 supporting the transfer techniques 208 that may be performed during the vehicle 102 states different from the current vehicle 102 state may still need to be transferred.

In response to determining that at least one downloaded software update 120 needs to be transferred, the process 300 may proceed to operation 318 where the update manager 112 determines whether the state of the vehicle 102 has changed. The update manager 112 may determine that the state of the vehicle 102 has changed in response to a corresponding signal from one or more vehicle controllers 116 and/or in response to detecting a change in vehicle speed, ignition state, transmission gear, and so on. Additionally or alternatively, the update manager 112 may determine that the change in vehicle 102 state has changed in response to vehicle speed, ignition state, transmission gear, and so on being a predefined value. In still another example, in response to determining that the vehicle 102 state has not changed, the update manager 112 checks the vehicle 102 state after a predefined period of time.

At operation 320, in response to determining that all downloaded software updates 120 has been transferred to the corresponding vehicle controllers 116, the update manager 112 determines whether any transferred software updates 120 remain to be installed on the corresponding controller 116. The process 300 may proceed to operation 322 in response to determining that at least one transferred software update 120 needs to be installed on the corresponding controllers 116. The update manager 112, at operation 322, detects whether the vehicle 102 state has changed. In one example, the update manager 112 checks the vehicle 102 state after a predefined period of time in response to determining that the vehicle 102 state has not changed.

In response to detecting that the vehicle 102 state changed, the process 300 proceeds to operation 312 where the update manager 112 determines whether the current vehicle 102 state is compatible with the installation techniques supported by the controllers 116 being updated. The update manager 112 may then install the transferred software updates 120 to the corresponding vehicle controllers 116 according to the installation techniques supported by each of the controllers 116.

The process 300 may end in response to the update manager 112 determining, at operation 320, that no transferred software updates 120 need to be installed, e.g., that all transferred software updates 120 have been installed according to the installation techniques supported by the controllers 116. In some examples, the process 300 may be repeated in response to the update manager 112 receiving the instructions indicative of the available software updates 120 and the transfer and installation techniques supported by the controllers 116 being updated.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising: a first controller; and a telematics control unit configured to, in response to receiving an instruction containing a transfer identifier and an installation identifier respectively indicative of a transfer technique and an installation technique supported by the first controller to update the first controller with a software update, identify a transfer state and an installation state compatible with the respective transfer technique and installation technique using a technique table, responsive to detecting the vehicle being in the installation state, install the software update to the first controller, wherein the transfer state is defined by one or more parameters associated with a transmission gear state and a vehicle speed, and the installation state is defined by one or more parameters associated with an ignition state and the transmission gear state.

2. The system of claim 1, wherein the transfer technique includes one of erase replace, erase replace with external storage, or A/B swap.

3. The system of claim 1, wherein the transfer technique is based on a hardware configuration of the first controller.

4. The system of claim 1, wherein the transfer and installation of the software updates is further in response to detecting a vehicle state change.

5. The system of claim 1, wherein the installation state is further defined by an operating parameter associated with a brake pedal, an accelerator pedal, and wheels of the vehicle.

6. The system of claim 1, wherein the transfer state and the installation state are different.

7. The system of claim 1, further comprising a second controller, wherein the telematics control unit is further configured to, in response to receiving the instructions, transfer the software updates to the first and second controllers in response to vehicle state being compatible with the transfer techniques supported by the first and second controllers.

8. The system of claim 7, wherein the telematics control unit is further configured to install the software updates to the second controller in response to detecting a vehicle state change.

9. A method for a vehicle comprising: in response to receiving, by a telematics control unit, an instruction containing a transfer identifier and an installation identifier respectively indicative of a transfer technique and an installation technique supported by a controller to update the controller with a software update, identifying a transfer state and an installation state compatible with the respective transfer technique and installation technique using a technique table; transferring the software update to the controller responsive to the vehicle being in the transfer state; and installing the software update to the controller responsive to the vehicle being in the installation state, wherein the transfer state is defined by one or more parameters associated with a transmission gear state and a brake pedal position, and the installation state is defined by one or more parameters associated with an ignition state and a steering angle.

10. The method of claim 9, wherein the transfer technique includes one of erase replace, erase replace with external storage, or A/B swap.

11. The method of claim 9, wherein the transfer technique is based on a hardware configuration of the controller.

12. The method of claim 9, wherein the transferring and installing of the software updates is further in response to detecting a vehicle state change.

13. The method of claim 9, wherein the transfer state and the installation state are different vehicle states.

14. The method of claim 9, further comprising, in response to receiving the instructions to update a pair of controllers, transferring the software updates to both controllers prior to vehicle state change and in response to current vehicle state being compatible with the transfer techniques supported by each of the controllers.

15. The method of claim 14, further comprising installing the software updates to one of the pair of controllers in response to detecting a vehicle state change.

16. A method comprising: receiving instructions to update first and second controllers, the instructions including identifiers indicating different transfer and installation techniques supported by the respective controllers; identify a plurality of transfer states and installation states compatible with the respective transfer technique and installation technique using a technique table; transferring a first software update to the first controller responsive to a vehicle being in a first transfer state; transferring a second software update to the second controller responsive to the vehicle being in a second transfer state; and installing the first software update to the first controller and the second software update to the second controller responsive to the vehicle being in an installation state compatible with the installation techniques for both the first and second controllers, wherein the first transfer technique is defined by one or more parameters associated with a transmission gear state and a climate control setting, and the second transfer technique and the installation technique are defined by one or more parameters associated with an ignition state and the transmission gear state.

17. The method of claim 16, wherein the transfer techniques include one of erase replace, erase replace with external storage, or A/B swap.

18. The method of claim 16, wherein the transfer and installation techniques are based on hardware configurations of each of the controllers.

19. The method of claim 16, wherein the installing of the software updates is in response to detecting a vehicle state change.

* * * * *